(12) United States Patent
Yoshikai

(10) Patent No.: US 7,804,516 B2
(45) Date of Patent: Sep. 28, 2010

(54) NETWORK CAPTURING APPARATUS, DISPLAYING METHOD, COMPUTER-READABLE RECORDING MEDIUM, AND NETWORK SYSTEM

(75) Inventor: Tadashi Yoshikai, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1350 days.

(21) Appl. No.: 11/167,921

(22) Filed: Jun. 28, 2005

(65) Prior Publication Data

US 2005/0285932 A1  Dec. 29, 2005

(30) Foreign Application Priority Data

Jun. 29, 2004 (JP) .......................... P2004-191147

(51) Int. Cl.
*H04N 7/15* (2006.01)
(52) U.S. Cl. ................................. 348/14.08
(58) Field of Classification Search .............. 348/14.08, 348/14.09, 14.01
See application file for complete search history.

(56) References Cited

U.S. PATENT DOCUMENTS

| | | | | |
|---|---|---|---|---|
| 6,128,649 | A | * | 10/2000 | Smith et al. ............... 348/14.08 |
| 7,499,969 | B1 | * | 3/2009 | van Os et al. ................ 709/203 |
| 2002/0057347 | A1 | | 5/2002 | Urisaka et al. |
| 2004/0109023 | A1 | | 6/2004 | Tsuchiya |

FOREIGN PATENT DOCUMENTS

| | | |
|---|---|---|
| JP | 09247637 | 9/1997 |
| JP | 2001-188740 | 7/2001 |
| JP | 2003-304350 | 10/2003 |
| WO | 99/63773 | 12/1999 |
| WO | 03/081892 | 10/2003 |

OTHER PUBLICATIONS

Japanese Office Action dated May 19, 2009 with English translation.
European Search Report dated Mar. 29, 2010.

* cited by examiner

*Primary Examiner*—Stella L Woo
(74) *Attorney, Agent, or Firm*—Dickinson Wright PLLC

(57) ABSTRACT

A network camera, a program and a network system, which can perform voice communications by comfortable operations. The network camera can transmit an image to at least one terminal capable of performing a voice communication in a half duplex manner, and can perform a voice communication with the terminal. The network camera creates and transmits page information to the terminal. This page information displays: a button indicating the possibility of outputting the voice when it receives a demand from the terminal, in case the voice output is not inhibited and in case another terminal is not outputting the voice; a button indicating the voice outputting, in case the voice output is done; and a button indicating a temporary voice output inhibit while another terminal is transmitting the voice, so that the page information can be altered, when depressed, to another button display in accordance with the change in the communication state.

32 Claims, 10 Drawing Sheets

NETWORK CAPTURING APPARATUS, DISPLAYING METHOD, COMPUTER-READABLE RECORDING MEDIUM, AND NETWORK SYSTEM

BACKGROUND OF THE INVENTION

The present invention relates to a network capturing apparatus capable of performing a voice communication, a displaying method for activating a computer system to control the network camera, a computer-readable recording medium storing the program, and a network system for performing image and voice communications with the computer system.

In recent years, there has spread the network system, in which an image is taken by a network camera and is transmitted to a computer system through the network such as the internet. However, this network system can acquire the image information by controlling the computer system but not the surrounding voice information. Thus, there has been developed the network camera (as will be called the "voice mapping type network camera"), which is enabled to perform not only the image communication but also the voice communication by mounting a speaker and a microphone.

FIG. 8 is an explanatory diagram of a network system for the voice communication of the related art. In this network system, in connection with the transmission of an image, an image taken by a camera 1 of a voice mapping type network camera 1 is compressed by an image processor 12, and this compressed image data is processed in a protocol by a communication control unit 13. This processed data is sent to a network 3 and to a computer system 2. This computer system 2 decompresses the image data received, and displays it on a screen. Although not shown in FIG. 8, a plurality of voice mapping type network cameras 1 are connected with the network 3 so that the computer system 2 acquires the image information taken by each camera 10 by interchanging the voice mapping type network cameras 1.

In connection with the voice communication, moreover, the voice inputted from a microphone 17 is subjected to an AD conversion and a compression by a voice transmission processor 15 so that the voice transmission data is sent through the communication control unit 13 and the network 3 to the computer system 2. This computer system 2 processes the voice transmission data received, and outputs a voice from a speaker 28. Likewise, the voice inputted from a microphone 27 of the computer system 2 is processed by the computer system 2 and is transmitted as the voice reception data so that it is sent through the network 3 to the voice mapping type network camera 1. In this voice mapping type network camera 1, the voice reception data received is transferred through the communication control unit 13 to a voice reception processor 14, in which the data is decompressed and DA-converted and is outputted to a speaker 18.

In case a user of the voice mapping type network camera 1 in this network system sends a voice and listens to a collected sound, the user inputs the voice to the microphone 27 of the computer system 2. After voice data was transmitted, the voice is outputted from the speaker 18 of the voice mapping type network camera 1. Simultaneously with this, the voice is collected by the microphone 17 and is transmitted to the computer system 2 so that it is outputted from the speaker 28. A control unit 19 controls the entire system of the voice mapping type network camera 1. On the other hand, the voice is processed in the computer system 2 by the JAVA (of a registered trade mark) applet program downloaded from the voice mapping type network camera 1.

When the image information is to be acquired from the plural voice mapping type network cameras 1, it has been proposed (as referred to JP-A-9-247637, for example) that the states of the voice being transmitted and received are displayed on the display. The network system of JP-A-9-247637 has been proposed for a TV conference system or the like, in which a plurality of video/audio communication terminals each equipped with a video camera, a microphone and a speaker are connected with the network. The screens to be displayed on the displays of the video/audio communication terminals display a list of the multi-point video display windows of the video cameras. There are also displayed camera control panels, direction buttons for the pan (horizontal) control and the tilt (vertical) control, and zoom buttons for the zoom controls. Moreover, there are further displayed the symbols for indicating the video transmissions. The displays of symbols indicate that the images taken by the video cameras are being sent to the network 3. While the symbol indicating the voice transmission is displayed and being displayed, it is indicated that the input by the microphone and the output of the input voice to the network are effective. While the symbol indicating the voice being received is being displayed, the voice received from the network and outputted by the speaker is effective.

In case the voice transmission/reception between the voice mapping type network camera 1 and the computer system 2 is made in a half duplex manner, the microphone 27 of the computer system 2 cannot be used while the sound around the voice mapping type network camera 1 is being outputted from the speaker 28 of the computer system 2. During the inputting from the microphone 27 of the computer system 2, on the other hand, the sound around the voice mapping type network camera 1 cannot be outputted from the speaker 28.

In case, moreover, the plural voice mapping type network cameras 1 are shared by a plurality of users in such network system, only earlier one of the users can use the microphone 27, but the remaining users cannot. If the information is not transmitted the individual users, the controls lose comfortableness.

Here in JP-A-9-247637, the symbol indicating the voice being transmitted is displayed in the display of the video/audio communication terminal of the TV conference system or the like, to indicate that the input and the transmission of the input voice to the network are effective. At the same time, the symbol indicating the voice being received is displayed to indicate that the voice output of the received voice from the network is effective. However, this TV conference system or the like does not perform the aforementioned voice transmission/reception in the half duplex communication.

In view of the problems of the related art thus far described, therefore, the invention has an object to provide a network capturing apparatus, a displaying method, a computer-readable recording medium, and a network system, which can perform voice communications simply by comfortable operations.

In order to solve the above problems of the related art, according to the invention, there is provided a network capturing apparatus capable of transmitting an image taken with a camera to one or more terminals made possible to perform the half duplex voice communication, through a network and communicating the terminal in voice. When a communication unit receives a demand from the terminal, a page information creation unit creates the page information, which makes: a first button display indicating the voice outputting possibility, in case the voice output is not inhibited and another terminal is not the voice output; a second button display indicating the voice output in case the voice output is performed; and a third button display indicating a temporary voice output inhibit, in case another terminal is in the voice transmission, and which can be altered, when selected, to another button display in accordance with the change in the communication state, and the communication unit transmits the page information to the terminal.

According to the network capturing apparatus, the displaying method, the computer-readable recording medium, and the network system of the invention, the voice communication can be done comfortably and simply merely by making controls while observing the icon on the screen displaying page.

In order to solve the above problems of the related art, according to the invention, there is provided a network capturing apparatus which is adapted to connect to at least one terminal through a network, comprising:

a page information generating unit that generates first page information to be displayed on the terminals;

a communication unit that communicates with the terminal through the internet;

a capturing unit that captures an image around the network capturing apparatus;

a voice collecting unit that collects a sound around the network capturing apparatus;

a voice outputting unit that outputs a sound based on sound data transmitted from the network; and a control unit that controls a voice communication with the sound data regarding the collected sound and the outputted sound in half duplex communication, wherein the page generating unit generates the first page information in response to a request of the first page information from the at least one of the terminal;

wherein the first page information includes an caption image captured by the capturing unit and at least one of a first display information, a second information and a third information;

wherein the first page information includes the first display information that indicates a voice outputting possibility in a case that the voice output is not inhibited at the terminal that transmits the request of the first page information and the another terminal does not output the sound data to the communication unit;

wherein the first page information includes the second display information that indicates a voice is outputting in a case that a voice output is performed at the terminal that transmits the request of the first page information;

wherein the first page information includes the third display information that indicates a temporary voice output inhibit in a case that the another terminal is in the voice data transmission; and wherein the page generating unit generates a second page information so as to change one display information to another display information in accordance with the change in a communication state of the network and a selection regarding at least one of the first to third display information and the communication unit transfers the second generated page information to the terminal.

In the above configuration, since the first display information (first button display) indicating a voice outputting possibility, the second display information (second button display) indicating a voice outputting, and a third display information (third button display) indicating a temporary voice output inhibit are displayed in the first page information, a current state of the voice communication is easily grasped at the terminal. Further, when some button display is depressed, the depressed button display is altered to other button display in accordance with the change of the state of the voice communication. Therefore, the voice communication can be easily and comfortably performed by operating while seeing the button display.

BRIEF DESCRIPTION OF THE DRAWINGS

The above objects and advantages of the present invention will become more apparent by describing in detail preferred exemplary embodiments thereof with reference to the accompanying drawings, wherein.

DESCRIPTION OF THE PREFERRED EMBODIMENTS

First Embodiment

Figure 1A:
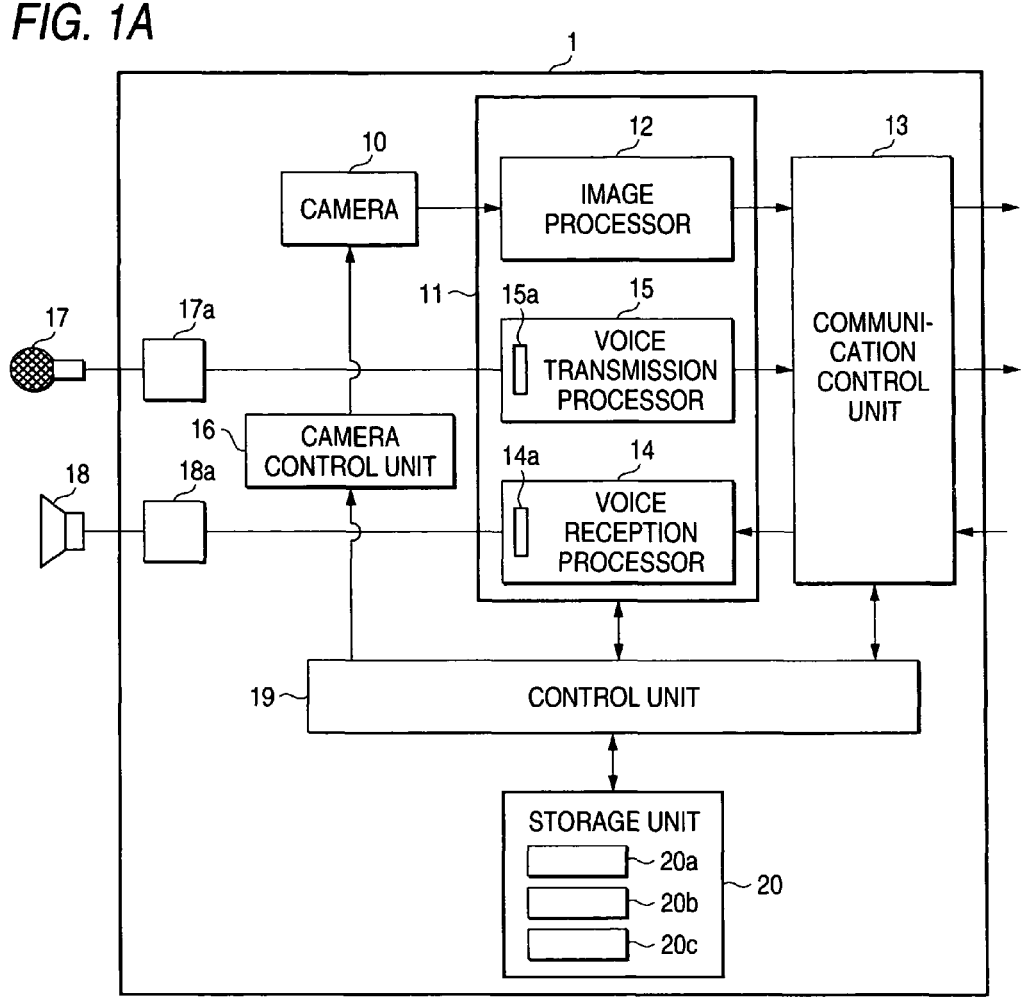
FIG. 1A is a configuration diagram of a network camera in the first embodiment of the invention.
Figure 1B:
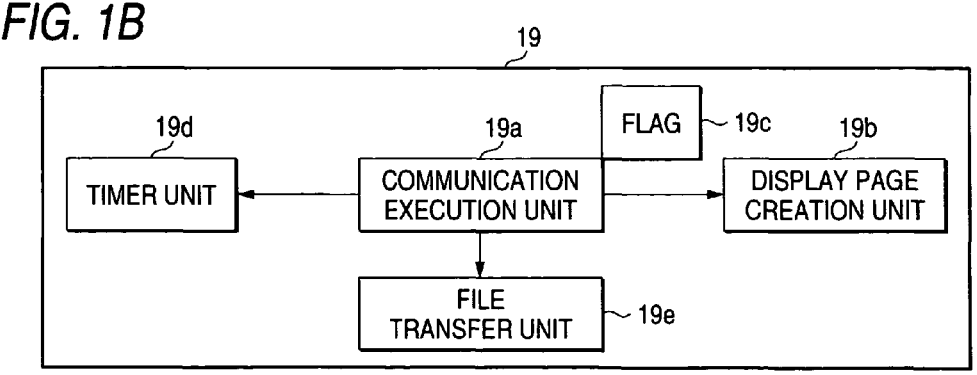
FIG. 1B is an internal block configuration diagram of the inside of a control unit of the network camera in the first embodiment of the invention.
Figure 2A:
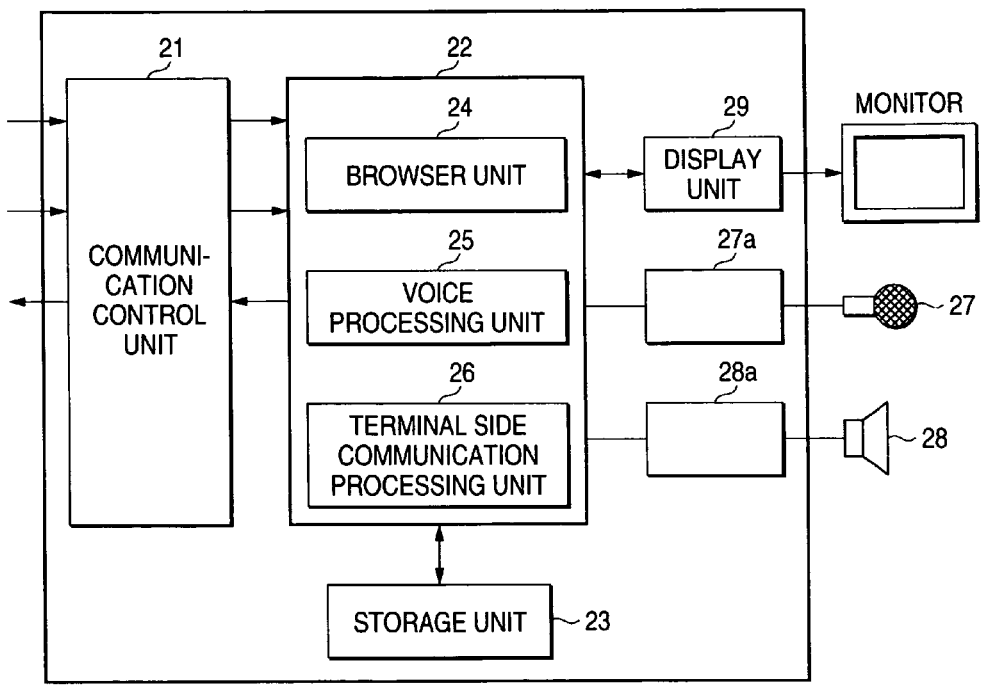
FIG. 2A is a block configuration diagram of a computer system in the first embodiment of the invention.
Figure 2B:
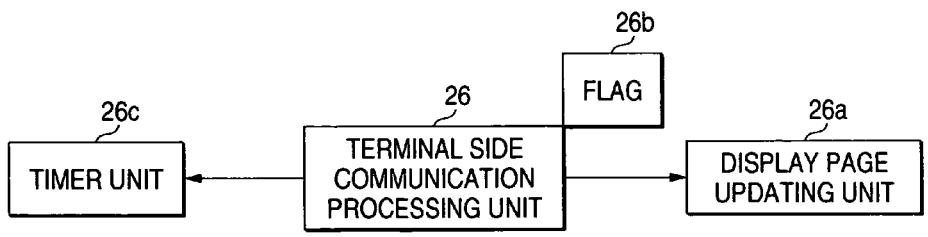
FIG. 2B is a block configuration diagram of the computer system of FIG. 2A having downloaded another program.
Figure 3:
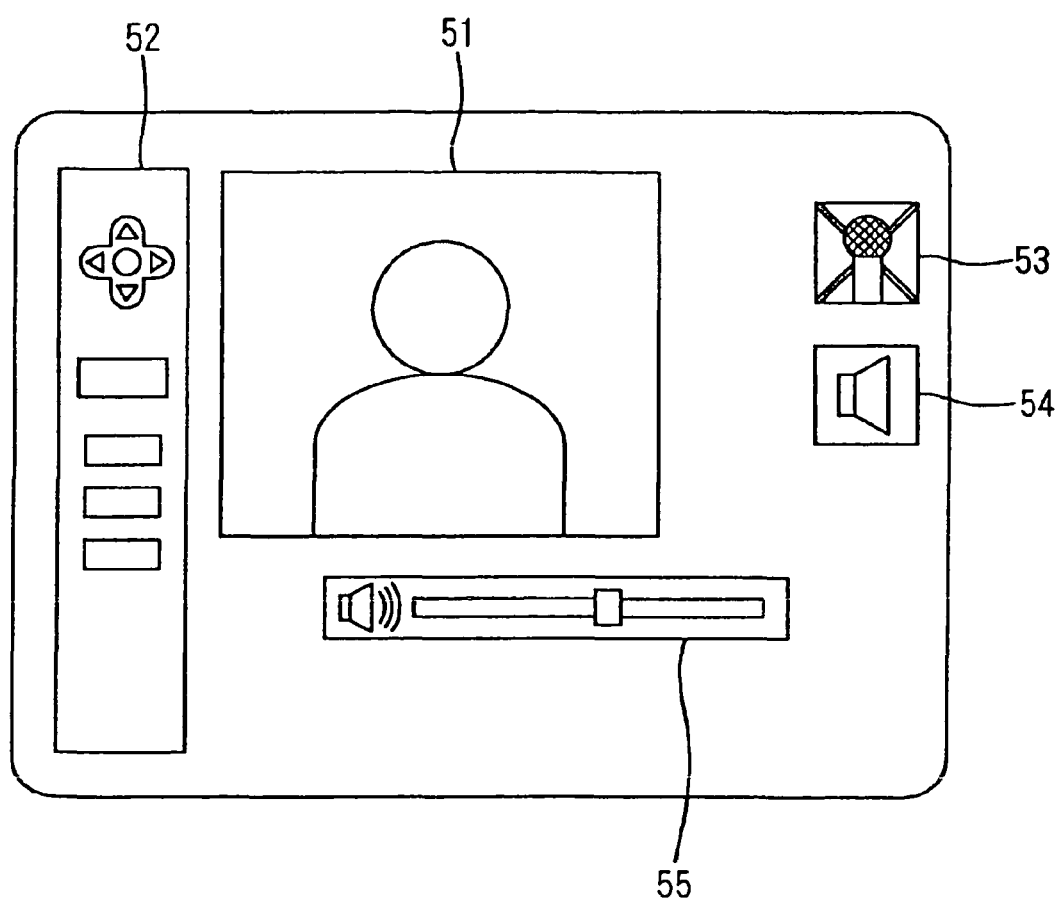
FIG. 3 is an explanatory view of a top page of the computer system in the first embodiment of the invention.
Figure 4:
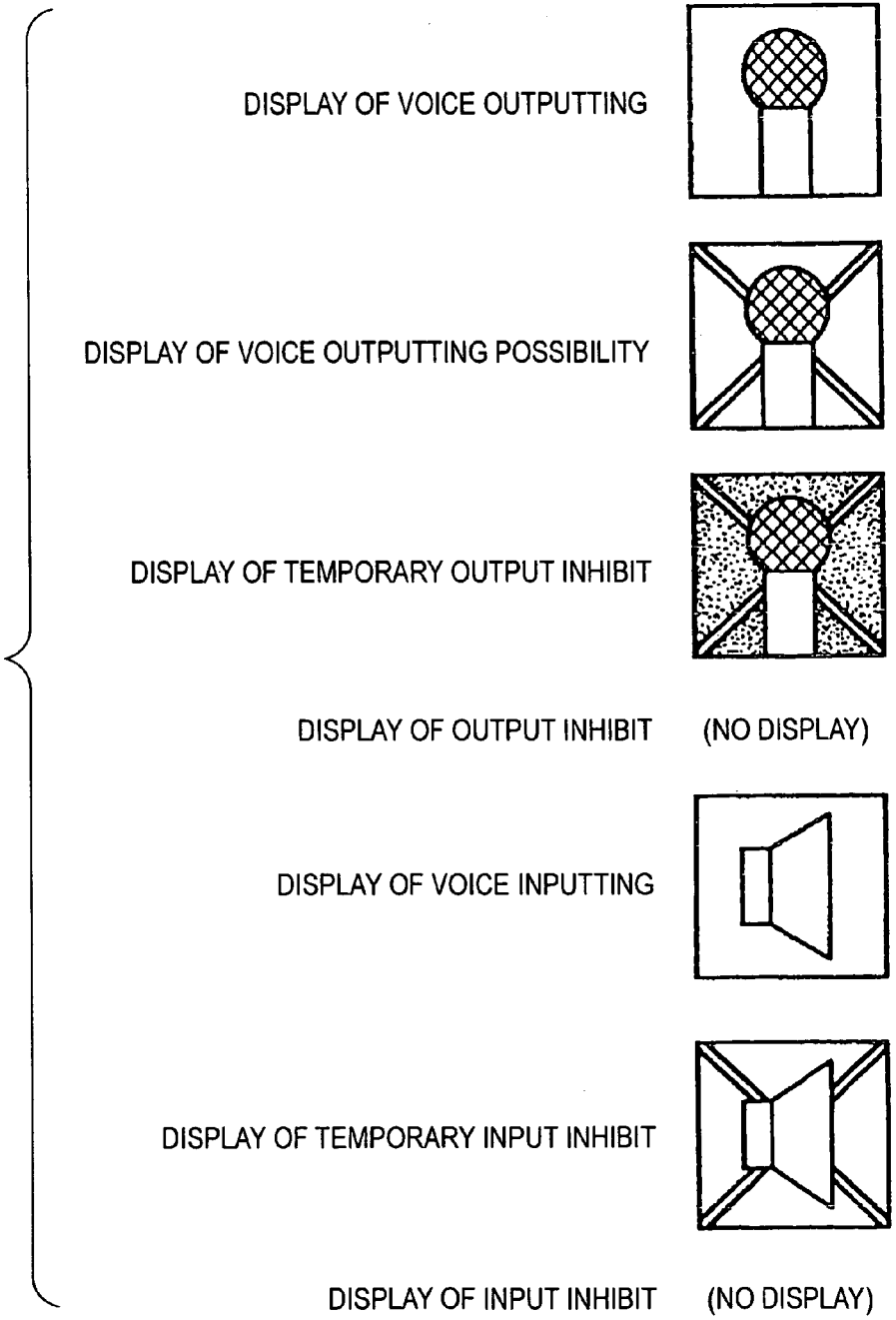
FIG. 4 is an explanatory diagram of a voice transmission display and a voice reception display in the first embodiment of the invention.

A network camera, a program and a network system according to the first embodiment of the invention will be described in the following. FIG. 1A is a configuration diagram of the network camera in the first embodiment of the invention; FIG. 1B is an internal block configuration diagram of the inside of a control unit of the network camera in the first embodiment of the invention; FIG. 2A is a block configuration diagram of a computer system in the first embodiment of the invention; FIG. 2B is a block configuration diagram of another program downloaded to the computer system of FIG. 2A; FIG. 3 is an explanatory view of a top page of the computer system in the first embodiment of the invention; and FIG. 4 is an explanatory diagram of a voice transmission display and a voice reception display in the first embodiment of the invention.

In FIGS. 1A and 1B: numeral 1 designates a voice mapping type network camera (or a network camera of the invention) having such a voice communication device mounted thereon and capable of taking and sending image and having voice communications; numeral 2 a computer system (or a terminal of the invention) such as a personal computer capable of having the voice communications; and numeral 3 a network such as the internet or Ethernet (of a registered trade mark). Numeral 10 designates a camera of the voice mapping type network camera 1; numeral 11 a CORDIC unit for compressing and decompressing the data to be transmitted and received; numeral 12 an image processor for compressing the image signals taken by the camera 10; and numeral 13 a communication control unit for processing the image data compressed by the image processor 12 in the protocol and for transmitting the processed data. Here, this protocol processing indicates the processing such as the TCP/IP protocol or the IEEE 802.03 protocol of the Ethernet (of the registered trade mark).

Numeral 14 designates a voice reception processor for decoding the voice reception data (or the PCM data) received by the voice mapping type network camera 1; numeral 14a a DA converter for converting the output or a digital signal (or a PAM signal) of the voice reception processor 14 into an analog signal; numeral 15 a voice transmission processor for encoding the voice inputted to the voice mapping type network camera 1; numeral 15a an AD converter for converting the output or an analog signal from a voice input adjusting circuit 17a (as will be described hereinafter); numeral 16 a camera control unit for controlling the pan, tilt and zoom of the camera 10; numeral 17 a microphone for inputting the voice of the surrounding of the voice mapping type network camera 1; numeral 17a the voice input adjusting circuit; numeral 18 a speaker for outputting a voice; and numeral 18a a voice output adjusting circuit.

Numeral 19 designates a control unit of the voice mapping type network camera 1; numeral 20 a storage unit; numeral 20a a set value storage stored with a set value; numeral 20b a symbol data storage stored with symbol data for displaying icons or the like on the screen of the computer system 2; and numeral 20c a transmission file stored with a program (as will be called the "terminal side communication processing unit") to be transmitted to the computer system 2 and executed by the CPU of the computer system 2, such as the active x or the JAVA (of a registered trade name) applets. The control unit 19 is provided with a central processing unit (CPU) and the storage unit 20 stored with the control program and data of the former, and the individual control functions are executed as a function realizing unit in the software by the program loaded from the storage unit 20. The reference numerals thus far described are basically identical to those, which have been explained in connection with the voice mapping type network camera 1 and the computer system 2.

With reference to FIG. 1B, here will be described a configuration and the program, which is read in the CPU and executed. The configuration communicates with the terminal side communication processing unit of the computer system 2, and displays the following items on the screen of the computer system 2 for the voice communications: (1) the display of voice transmitting (i.e., the display of a second button of the invention); (2) the display of voice transmittable (i.e., the display of a first button of the invention): (3) the display of temporary voice transmission inhibit (i.e., the display of a third button of the invention); (4) the display of voice transmission inhibit; (1*) the display of voice receiving (i.e., the display of a fifth button of the invention); (2*) the display of temporary voice reception inhibit (i.e., the display of a fourth button of the invention); and (3*) the display of voice reception inhibit. In the following, the case, in which the voice data is transmitted to the voice mapping type network camera 1 and outputted from the speaker, will be called the "voice transmission" (i.e., the voice output of the invention), and the case, in which the voice data inputted from the microphone of the voice mapping type network camera 1 is received so that the voice is outputted, will be called the "voice reception". Those displays (1) to (4) will be detailed hereinafter.

In FIG. 1B, numeral 19a designates a communication execution unit (or the communication unit of the invention) for performing the voice communication and the image transmission when the voice transmission mode is selected from the computer system 2, and numeral 19b designates a display page creation unit for creating the page information to be transmitted from the voice mapping type network camera 1 to the computer system 2. The aforementioned voice communication mode is composed of four kinds: a voice transmission/reception (half duplex) mode; a first one-way (i.e., the network camera→the computer system) mode; a second one-way (i.e., the computer system→the network camera) mode; and a voice inhibit mode. Numeral 19c designates a flag for indicating the communication sates of the plural computer systems 2 making access to the voice mapping type network camera 1, such as what is communicating or what is inhibited from the voice communication, and numeral 19d designates a timer unit for measuring the time of the case, in which the communication state mode is changed after lapse of the time. This timer unit 19d counts a predetermined time by utilizing the fundamental dock of the computer system 2. Numeral 19e designates a file transfer unit for downloading the later-described terminal side communication processing unit 26, such as the program of the active x or the JAVA (of the registered trade mark) stored in the transmission file 20c.

When the communication execution unit 19a is demanded for a voice by the terminal side communication processing unit 26, the display page creation unit 19b creates the page information with reference to the flag 19c. Here, the communication execution unit 19a, the display page creation unit 19b and the file transfer unit 19e configure altogether the function realizing unit of the aforementioned control unit 19. The communication execution unit 19a confines the individual image and voice data and the page information created by the display page creation unit 19b, in the IP packet, and communicates in the HTTP through the communication control unit 13.

The configuration of the computer system 2 will be described with reference to FIG. 2A. In FIG. 2A: numeral 21 designates a communication control unit acting as an interface with the network 3; numeral 22 a control operation unit equipped with a CPU as a hardware and realized as a function realizing unit by reading the program from a storage unit-23 for storing a program and data; numeral 24 designates a browser unit for acquiring and perusing the image displaying information (e.g., the web page) from the site on the network 3, numeral 25 designates a voice processing unit realized as a function realizing unit with the program for the voice communication, such as the JAVA (of the registered trade mark) applet program or the plug-in; numeral 26 designates the terminal side communication processing unit which is realized by the program downloaded by the file transfer unit 19e of the voice mapping type network camera 1, such as the active x or the JAVA (of the registered trade mark); numeral 27 a microphone; numeral 27a a voice input circuit; the numeral 28 a speaker; numeral 28a a voice output circuit; and numeral 29 a display unit. The browser unit 24 is the function realizing unit to be realized by the general-purpose browser program. The terminal side communication processing unit 26 expands the functions of the browser unit 24 and the voice processing unit 25 there to perform the half duplex communications so that the voice processing unit 25 may perform the transmission/reception alternately on the voice communication. A dedicated program can also be mounted as the terminal side communication processing unit 26.

Subsequently, here is described the actions of the voice mapping type network camera 1 and the computer system 2 of the first embodiment at the voice communication time. The browser unit 24 of the computer system 2 makes access to the communication execution unit 19a of the voice mapping type network camera 1 and demands the voice mapping type network camera 1 for the top page. The (not-shown) top page is provided with select buttons for selecting whether or not the communication is to be performed and whether or not the set value of the system is to be inputted. When the communication select button is pushed, the portal screen displaying information such as the HTML is transmitted from the voice mapping type network camera 1. In case the setting select button is pushed, on the other hand, the set input page is transmitted from the voice mapping type network camera 1. The setting is completed when the input is made on the setting input page.

At first, here is described the portal screen displaying information. In FIG. 3, numeral 51 designates an image area of time-varying images or still images, and numeral 52 designates c control bar for controlling the camera 10 of the voice mapping type network camera 1. Numeral 53 designates a voice transmission display button for displaying the current communication state of the voice transmission to the voice mapping type network camera 1 and for changing the communication state when pushed, and numeral 54 designates a voice reception display button for indicating the current output state of the voice inputted to the voice mapping type network camera 1. Numeral 55 designates a volume adjusting bar for adjusting the volume to be outputted from the speaker 18 of the voice mapping type network camera 1. The client of the voice mapping type network camera 1 receives the portal screen displaying information on the monitor and controls the direction control button and the zoom adjusting bar of the control bar 52 while observing the image on the portal screen thereby to switch the angle or the like of the camera 10 and to acquire a new image. In the voice communication mode, the client controls the voice transmission display button 53, the voice reception display button 54 and the volume adjusting bar 55.

Here in the first embodiment, the voice transmission display buttons 53 are exemplified by four kinds (although three kinds in the first embodiment) of buttons indicating the communication states: (1) the display of voice transmitting; (2) the display of voice transmittable: (3) the display of temporary voice transmission inhibit; and (4) the display of voice transmission inhibit (although not displayed in the first embodiment), and by three kinds (although two kinds in the first embodiment) of buttons indicating the communication states: (1*) the display of voice receiving; (2*) the display of temporary voice reception inhibit; and (3*) the display of voice reception inhibit (although not displayed in the first embodiment). These displays individually indicate, when active, the present states of the voice transmission and the voice reception, and the modes can be changed by depressing the voice transmission display button 53 and the voice reception display button 54.

The display of voice transmitting is activated when the display of voice transmittable is pushed, and the voice transmission is ended to restore the display of voice transmittable when the display of voice transmitting is pushed. In the absence of any user in the voice transmission when the display of temporary voice transmission inhibit is pushed, the display is changed into that of voice transmission. Likewise, the display of voice receiving is activated when the display of temporary voice reception inhibit is pushed, and the display of temporary voice reception inhibit is restored when the display of voice receiving is pushed. Thus in the invention, the display is changed into another button display according to the change in the communication state, when each button display is depressed. Moreover, the display of temporary voice transmission inhibit can be automatically returned to the mode of initial communication state by a timer after a predetermined time elapsed. These actions will be detailed hereinafter.

The communication state displayed in the portal screen displaying information of FIG. 3 reflects the setting by the user. The voice transmission display button 53 indicates the display of voice transmittable, and the voice reception display button 54 indicates the display of voice receiving (as will be called the "voice transmittable/voice receiving") in the voice transmission/reception (half duplex) mode. The voice transmission display button 53 could also be set to the voice transmitting, and the voice reception display button 54 could also be set to the temporary voice reception inhibit (as will be called the "voice transmitting/temporary voice reception inhibit"). However, those buttons 53 and 54 are usually set to the (voice transmittable/voice receiving), because other clients are affected. In addition, in case the voice reception inhibit and the voice reception inhibit (as will be called the "voice reception inhibit/voice reception inhibit") are selected by using a setting input page, for example, the voice inhibit mode comes in so that the voice transmission display button 53 and the voice reception display button 54 are not displayed. At this time, the voice inhibit prevails so that the display of the volume adjusting bar 55 is stopped. When the voice transmission display button 53 and the voice reception display button 54 are set to the (voice transmission inhibit/voice receiving) and the (voice transmittable/voice reception inhibit), respectively, they come into the first one-way mode and the second one-way mode, respectively. By pushing the voice transmission display button 53 and the voice reception display button 54, moreover, the communication state can be changed to make the mode change. In the first embodiment, however, the initial setting mode is restored when a predetermined time elapses after the mode changed from the initial setting.

Here, the processing differs in the voice mapping type network camera 1 between the cases, in which the voice mapping type network camera 1 and the computer system 2 performs the (half duplex) voice transmission/reception in one-to-one (i.e., a single user) and in one-to-plurality (i.e., plural users). Especially when a plurality of computer systems 2 are connected, this voice transmission is the half duplex one so that the portal screen display information differs between the computer system 2 having acquired the voice path and the remaining computer systems 2 having failed.

Figure 5A:
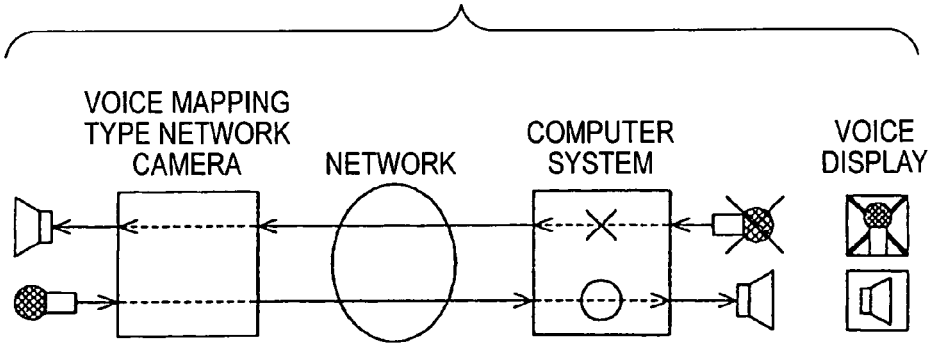
FIG. 5A is an explanatory diagram of an initial communication state of the case of a single user of a network system in the first embodiment of the invention.
Figure 5B:
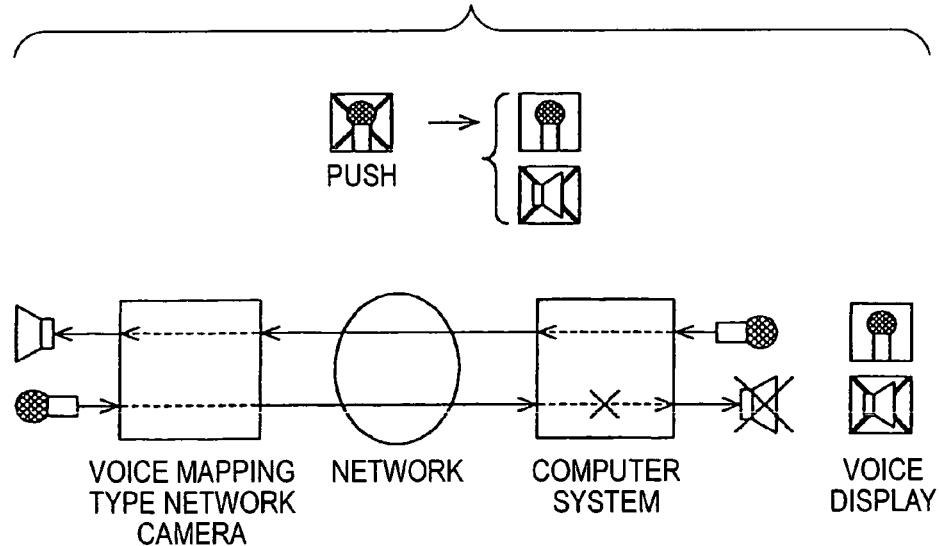
FIG. 5B is an explanatory diagram at the time when the voice display in the initial communication state of FIG. 5A is pushed.

First of all, here will be described the case, in which the voice mapping type network camera 1 and the computer system 2 performs the (half duplex) voice transmission/reception in one-to-one (with the single user). In the initial communication state, as shown in FIG. 5A, the portal screen displaying information described with the HTML or the like of FIG. 3, and the communication state is in the (voice transmittable/voice receiving) so that the screen has the display of voice transmittable and the display of voice receiving. In case the voice is to be sent in the state of FIG. 5A from the computer system 2 to the voice mapping type network camera 1, the voice transmission display button 53 of the display of voice transmittable is depressed. At this time, the terminal side communication processing unit 26 informs the voice mapping type network camera 1 of it, the communication execution unit 19a of the voice mapping type network camera 1 changes the flag 19c from the initial communication state (i.e., the voice transmittable/voice receiving) to the state of (the voice transmitting/temporary voice reception inhibit). The display page creation unit 19b creates the page information described in the HTML or the like so that the voice transmission display button 53 of the portal screen displaying information may change into the displace of voice transmitting. At the same time, because of the half duplex communication, the voice reception display button 54 changes from the display of voice receiving into the display of temporary voice reception inhibit. As a result, the communication execution unit 19a transmits the portal screen displaying information displaying the (voice transmitting/temporary voice reception inhibit), as shown in FIG. 5B, to the computer system 2, and displays it on the monitor. Here, the packet of the voice transmission data is transmitted from the voice mapping type network camera 1, but the voice data received by the computer system 2 is muted by the terminal side communication processing unit 26 so that it is not outputted from the speaker 28.

After this, if the no-voice state continues after the communication through the microphone 27, the timer unit 19d counts a predetermined time period. When this time period elapses, the communication execution unit 19a changes the flag 19c from the communication state of the (voice transmitting/temporary voice reception inhibit) into the communication state of the (voice transmittable/voice receiving), and informs the computer system 2 of this change. If the computer system 2 having received this demands a new portal screen displaying information, the communication execution unit 19a the portal screen displaying information of the display indicating the updated (voice transmittable/voice receiving) to the computer system 2, and displays the information on the display. In case, therefore, the voice transmission is further continued, it is necessary to push the voice transmission display button 53 again.

Here, the configuration thus far described for updating the portal screen displaying information can also be replaced by a configuration of the program containing the terminal side communication processing unit 26, as shown in FIG. 2B, so that the portal screen displaying information can be updated. Numeral 26a designates a display page updating unit for updating a portal description of the page information described in the HTML or the like; numeral 26b a flag for indicating the communication state; and numeral 26c a timer unit for measuring the time period of the case, in which the mode is altered with the time lapse.

In the case of the configuration of this program, when the voice transmission display button 53 for the display of voice transmittable is depressed, the terminal side communication processing unit 26 informs the voice mapping type network camera 1 of the depression. Moreover the flag 26b indicating the communication state is altered to the (voice transmitting/temporary voice transmission inhibit); the voice transmission display button 53 of the portal screen displaying information is altered from the display of voice transmittable to the display of voice transmitting; and the voice reception display button 54 is altered from the display of voice receiving to the display of temporary voice reception inhibit. Here, the data of these individual icons is downloaded together with the program of the terminal side communication processing unit 26. The portal screen displaying information thus processed is instantly displayed on the monitor of the computer system 2.

In the update of the portal screen displaying information continuing in the no-voice state, the time lapse is measured by the timer unit 26c on the side of the computer system 2. The terminal side communication processing unit 26 alters the flag 26b from the (voice transmitting/temporary voice reception inhibit) to the (voice transmittable/voice receiving), and the portal screen displaying information altered is displayed on the monitor. If the portal screen displaying information is updated with this configuration of FIG. 2B, the processing can be facilitated for the high-speed processing.

Figure 6A:
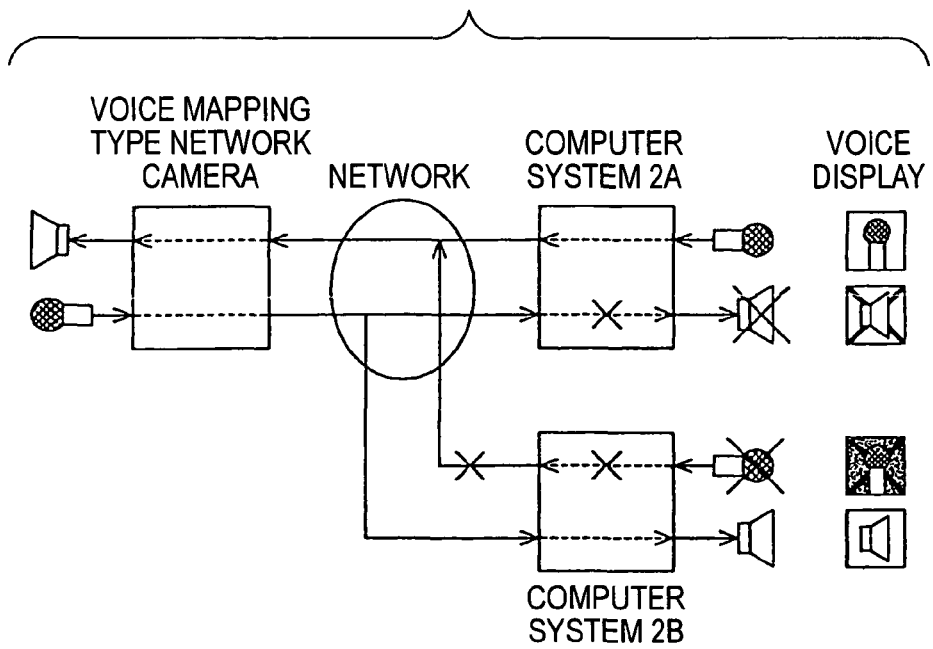
FIG. 6A is an explanatory diagram of an initial communication state of the case of a plurality of users of a network system in the first embodiment of the invention.
Figure 6B:
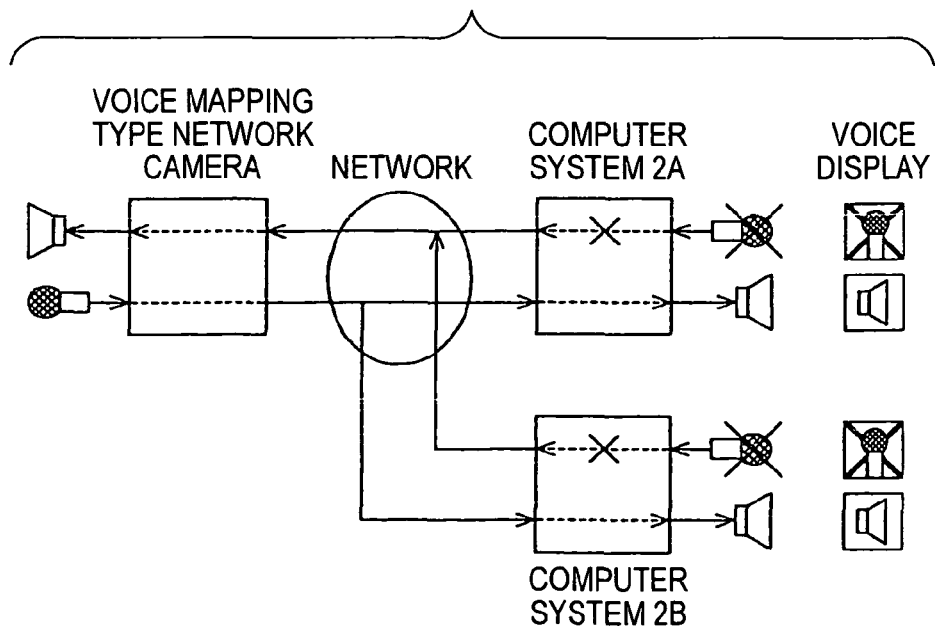
FIG. 6B is an explanatory diagram at the time when the voice display of a first computer system in the initial communication state of FIG. 5A is pushed.

Subsequently, here is described the case, in which the voice mapping type network camera 1 and the computer system 2 perform the (half duplex) voice transmission/reception in one-to-plurality (with plural users). FIG. 6A is an explanatory diagram of the initial communication state of the case of the plural users of the network system in the first embodiment of the invention, and FIG. 6B is an explanatory diagram of the communication state at the time when the voice display of the first computer system in the initial communication state of FIG. 6A is pushed. If the user of a computer system 2A shown in FIG. 6A makes access to the voice mapping type network camera and if the user of a computer system 2B then makes access, the communication execution unit 19a refers at first to the flag 19c, and starts the (half duplex) voice transmission/reception with the computer system 2 having made access, only when the flag of voice transmitting is not raised. In short, only the voice communication between the computer system 2A and the voice mapping type network camera 1 is effective for the earlier user. Therefore, the computer system 2A starts the voice communication according to the setting. The setting of the computer system 2A of FIG. 6A is in the communicating state of the (voice transmitting/temporary voice reception inhibit), and the voice is outputted from the voice mapping type network camera 1 so that the output of the voice collected by the microphone 17 of the voice mapping type network camera 1 is stopped from the computer system 2A. If the computer system 2A has the setting of the (voice transmittable/voice receiving), the state is established, as shown in FIG. 5A. In this state, the voice cannot be outputted from the speaker 18 of the voice mapping type network camera 1, but the voice collected by the microphone 17 can be outputted from the computer system 2A.

When the computer system 2B makes second access while the computer system 2A making access, the communication execution unit 19a of the voice mapping type network camera 1 refers to the flag 19c and detects that the flag of the computer system 2A is in the voice transmission. The communication execution unit 19a alters the flag of the computer system 2B from the communicating state of the set (voice transmittable/voice receiving) to the communicating state of the (temporary voice transmission inhibit/voice receiving), and transmits the portal screen displaying information having the display of the temporary voice transmission inhibit 1 voice receiving, and displays it in the computer system 2B. When the user of the computer system 2B pushes the display of temporary voice transmission inhibit, the terminal side communication processing unit 26 of the computer system 2B inquires the communication execution unit 19a of the voice mapping type network camera 1 whether or not the communication can be made. In case the communication execution unit 19a refers to the flag 19c so that the flag of the computer system 2A is in the voice transmission, the communication execution unit 19a continues the display of temporary voice transmission inhibit.

When this state of temporary voice transmission inhibit then continues for a predetermined time, in the first embodiment, the communication execution unit 19a alters the flag of the computer system 2B to the (voice transmittable/voice receiving), and causes the display page creation unit 19b to create new portal screen displaying information and the monitor of the computer system 2B to display the portal screen displaying information having the display of voice transmittable/voice receiving, as shown in FIG. 6B. When this display of voice transmittable of the portal screen displaying information is depressed, the voice can be transmitted from the voice mapping type network camera 1. When the voice communication of the computer system 2A ends to leave the display of temporary voice transmission inhibit as it is, the terminal side communication processing unit 26 of the computer system 2B is caused by the push of the display of voice transmission inhibit by the user of the computer system 2B to inquire the communication execution unit 19a of the voice mapping type network camera 1. The terminal side communication processing unit 26 refers to the flag 19c and knows that the flag of the computer system 2A disappears in the voice transmission, and alters the display to the portal screen displaying information of the display of voice transmittable/voice receiving, as shown in FIG. 6B.

Here, it is also possible to adopt the method, in which after the display of temporary voice transmission inhibit was pushed, the terminal side communication processing unit 26 of the computer system 2B periodically demands the communication execution unit 19a of the voice mapping type network camera 1 for the notification of the network camera. At this time, the communication execution unit 19a refers to the flag 19c and can cause the display page creation unit 19b to create new portal screen displaying information at the instant when the flag of the computer system 2A is not transmitting the voice. The communication execution unit 19a can also transmit the portal screen displaying information to the computer system 2B and can display it on the monitor. In this case, when the voice communication ends, the display automatically changes into the display of voice transmittable 1 voice receiving so that the communication execution unit 19a is remarkably usable for the user.

In the computer system 2A of the first embodiment, the terminal side communication processing unit 26 mutes the voice data, which is sent from the voice mapping type network camera 1, in the computer system 2A so that no influence is exerted on the voice transmission data transmitted from the voice mapping type network camera 1. By bringing the computer system 2B into the communication state of (voice transmittable/voice receiving), the voice collected by the microphone 17 can be outputted from the computer system 2A. It should be noted at this time in connection with privacy that the voice being outputted by the user of the computer system 2A from the speaker 18 of the voice mapping type network camera 1 can be heard with the microphone 17 by the user of the computer system 2B making access to the same voice mapping type network camera 1. Here, the echo to be produced when the voice loop is formed is not applied to the output from the speaker 28 of the computer system 2B.

The description thus far made is directed to the case of the (half duplex) voice transmission/reception. However, the one-way communication mode is established in case the voice transmission inhibit or the voice reception inhibit is set. This one-way communication is divided into a first one-way communication mode for transmitting the voice from the voice mapping type network camera 1 to the computer system 2, and a second one-way communication mode, in which the voice is transmitted from the computer system 2 to the voice mapping type network camera 1.

In the first one-way communication mode, the display of voice transmission inhibit is not made, but either the display of voice receiving indicating the output from the speaker 28 or the display of temporary voice reception inhibit is made. In case the display of temporary voice reception inhibit is made, the display is altered to the display of voice receiving when the voice reception display button 54 is depressed.

In the second one-way communication mode, on the other hand, the display of voice reception inhibit is not made. When the display of voice transmittable is pushed, the display is altered to the display of voice inputting, in which the voice can be inputted as it is from the microphone 27, in case the single user is making access. When the user pushes the display of voice receiving at the end of the communication, the display is altered into the display of voice transmittable. When the communication ends, the display is automatically altered without any action into the display of voice transmittable when a predetermined time elapses.

In case a plurality of users are making access, the first access user can perform the voice communication if he or she pushes the voice transmission display button 53 in the display of voice transmittable. Another user of later access cannot perform the voice communication because of the display of temporary voice transmission inhibit, even if he or she pushes the voice transmission display button 53. When the display is altered to the display of voice transmittable when a time elapses after the end of the first communication, the communication is reopened by pushing that voice transmission display button 53.

In the case of the voice inhibit mode, the voice transmission display mode 53 and the voice reception display button 54 are not displayed, but the display of the volume adjusting bar 55 is stopped. Merely by the setting of the user, therefore, the information is altered to the portal screen displaying information only for the transmission/reception of the image from the voice mapping type network camera 1.

Figure 7:
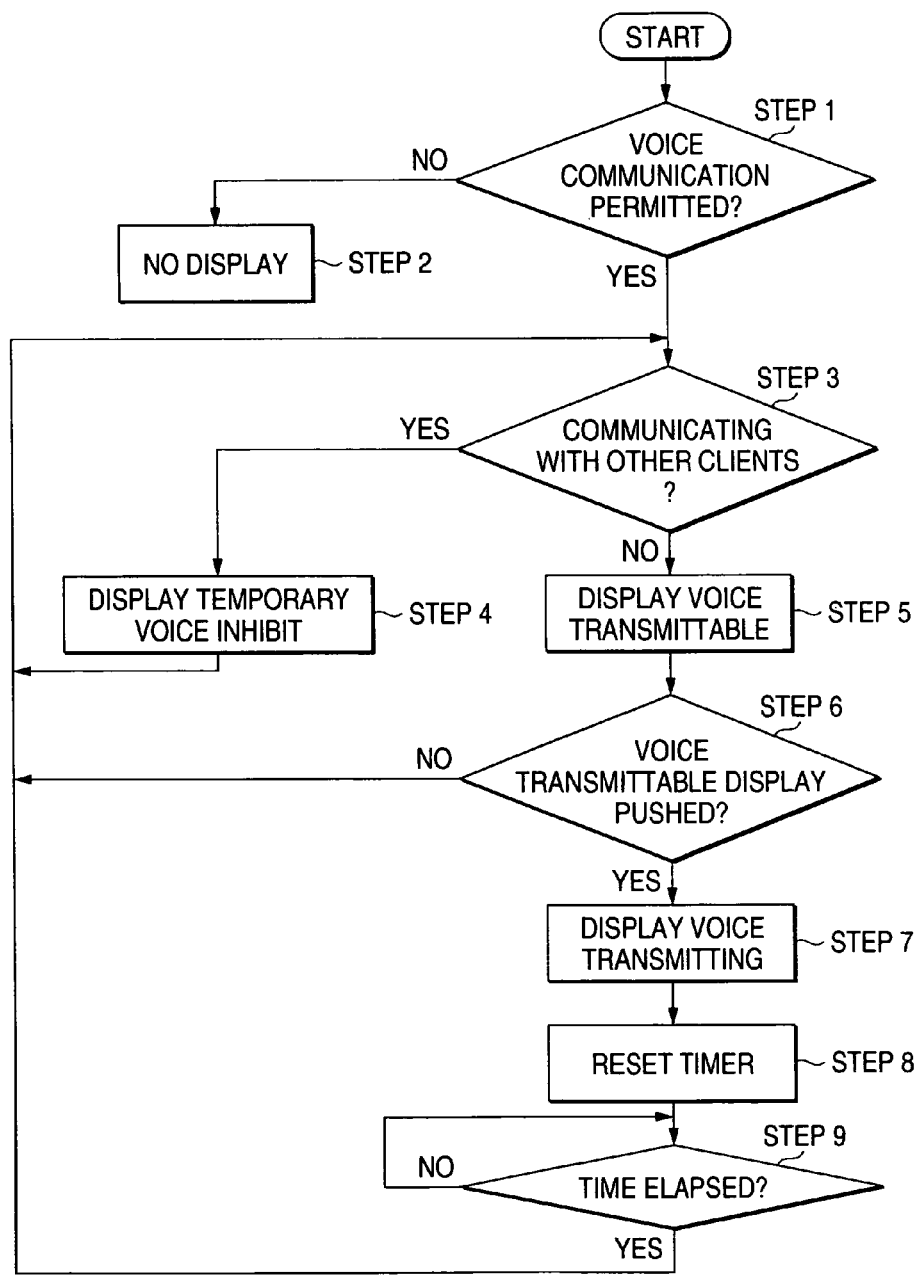
FIG. 7 is a flow chart of the voice transmission display in the network system in the first embodiment of the invention.
Figure 8:
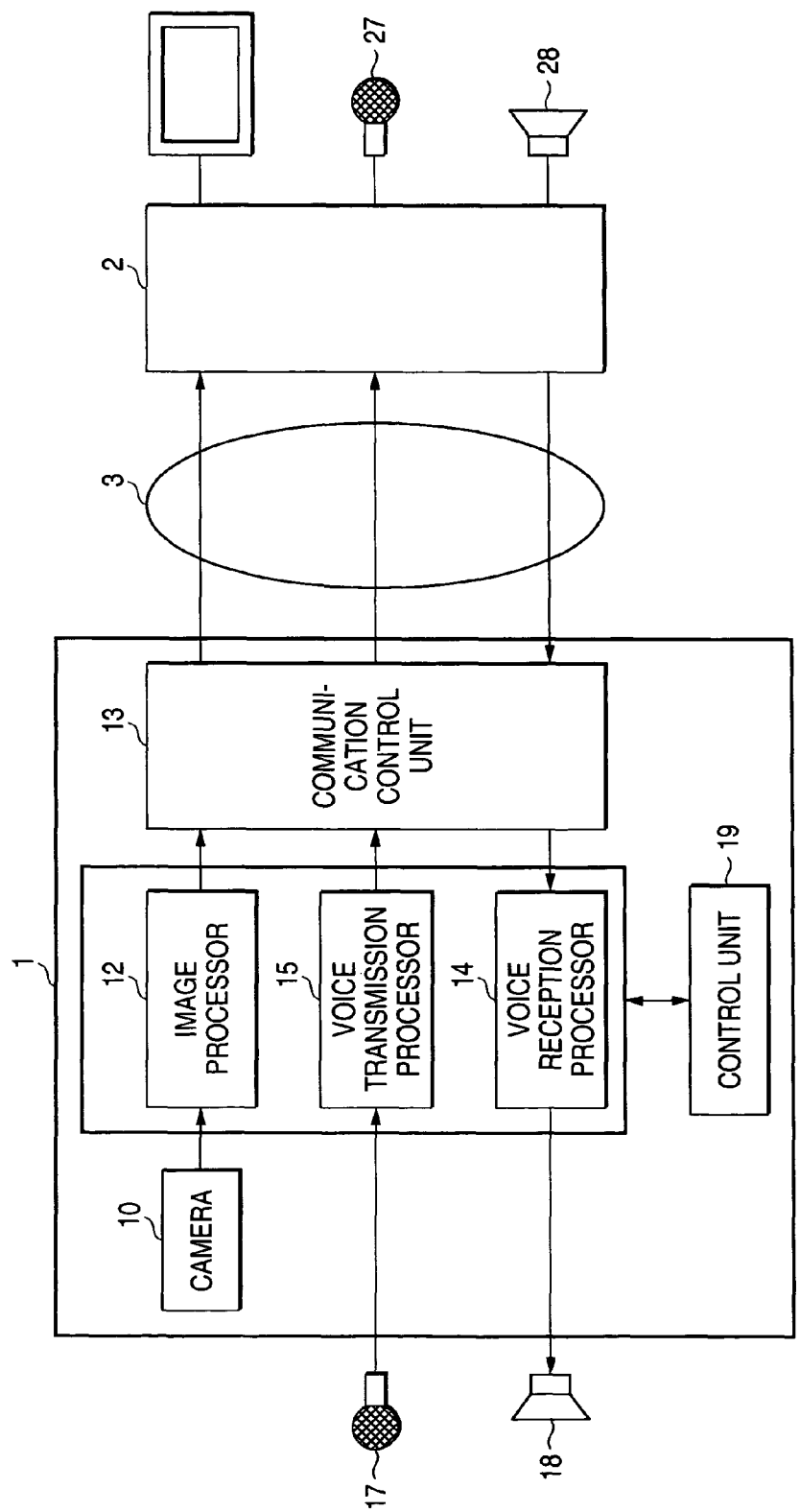
FIG. 8 is an explanatory diagram of the network system for the voice communications of the related art.

Subsequently, here is described the flow for the voice transmission display in the network system of the first embodiment of the invention. The voice transmittable mode is set as a reference communication state mode. FIG. 7 is a flow chart of the voice transmission display in the network system in the first embodiment of the invention. In FIG. 7, it is checked (at step 1) whether or not the voice communication is permitted by the setting and whether or not the voice transmission is inhibited. In case the setting is the voice transmission inhibit, the display of voice transmission is not made (at step 2). In case the voice communication is permitted at step 1, it is decided (at step 3) with reference to the flag whether or not the communication is being made with other clients (or the computer system). In the communication with other clients, the display of temporary voice transmission inhibit is made (at step 4), and the routine returns to step 3 and stands by till the voice communication with other clients ends. Not in the communication with other clients, the display of voice transmittable is made (at step 5).

Next, it is decided (at step 6) whether or not the display of voice transmittable is depressed. In the case of no depression, the routine is returned to step 3 and stands by till the depression. In case the display of voice transmittable is depressed at step 6, the display is altered to the display of voice transmitting (at step 7). At the same time, the timer is reset (at step 8). When the time elapsed (at step 8), the routine returns to step 3, and the routine is repeated.

In case the voice communication is permitted by the actions thus far described, the display of voice transmittable is made unless the communication is made with other clients. When the voice communication is to be made, the display of voice transmittable is pushed for the communication with the display of voice transmitting. When a time elapses after the end of communication, the routine is automatically restored. The icon display of the portal screen displaying information is made understandable so that the controls can be made easy and excellent.

As has been described hereinbefore, the voice mapping type network camera, the program and the network system of the first embodiment are enabled to perform the voice communication comfortably and simply by the controls made by observing the icon for the portal screen displaying information.

In the above configurations, the page generating unit generates the page information in which no display information (no button display) is displayed in a case of the voice outputting inhibit. Therefore, a content of a display is not complex since the display indicating the voice outputting inhibit is not displayed.

Preferably, the page generating unit of the network camera generates a page information having the second display information (second button display) indicating that the voice is outputting, instead of the first display information (first button display), when the communication unit receives a request indicating that the first display information (first button display) is selected in the page information from the terminal. Therefore, when the first button display (first button display) is depressed, the display is altered to the second button display indicating a voice outputting in accordance with the change of communication state. As a result, the operation of the network system and the state of the network are easily grasped.

Preferably, the page information having the first display information (first button display), further includes a fourth display information (fourth button display) indicating a temporary voice output inhibit. The page generating unit generates the page information having the second display information (second button display) and a fifth display information (fifth button display) indicating that a voice is received, instead of the first display information (first button display) and the fourth display information (fourth button display) (fourth button display), when the communication unit receives a request indicating that the fourth display information (fourth button display) is selected in the page information from the terminal. Therefore, since the fourth display information (fourth button display) (fourth button display) and the fifth display information (fifth button display) (fifth button display) are displayed on the page information, the button operation can be performed with a focus on listening the sound. Further, since the button display regarding a sound outputting can be simultaneously changed, the operation becomes more easily.

Preferably, the page generating unit generates the page information having the first display information (first button display), instead of the second display information (second button display), when the communication unit receives a request indicating that the second display information (second button display) is selected in the page information from the terminal. Therefore, when the second button display indicating the sound outputting is depressed, the display is cyclically returned to the first button display (first button display) indicating the voice outputting possibility in accordance with the change of communication state. As a result, the operation of the network system and the state of the network are easily grasped.

Preferably, the page generating unit generates the page information having the first display information (first button display), instead of the third display information (third button display), when the communication unit receives a request indicating that the third display information (third button display) in the page information is selected from the terminal. Therefore, when the third button display indicating the temporary voice output inhibit is depressed, the display is altered to the first button display indicating the voice outputting possibility in accordance with the change of communication state. As a result, the operation of the network system and the state of the network are easily grasped.

Preferably, the page generating unit generates the page information instead of the second display information (second button display), when a predetermined time counted by timer unit elapses in a case that the second display information (second button display) is displayed on the terminal after a termination of the voice communication. Therefore, when the time counted by the timer unit is reached to a predetermined time, the button display is altered to the first button display indicating the voice outputting possibility automatically. As a result, the operation becomes more easily.

Preferably, the control unit transmits the page information having the third display information (third button display), instead of the first display information (first button display), to the terminal in communication, when the communication unit receives a request for a network capturing apparatus state notification periodically after a termination of the voice output of another terminal in communication. Therefore, the button display is automatically altered from the first button display indicating the voice outputting possibility to the third button display indicating the temporary voice output inhibit.

Second Embodiment

Figure 9:
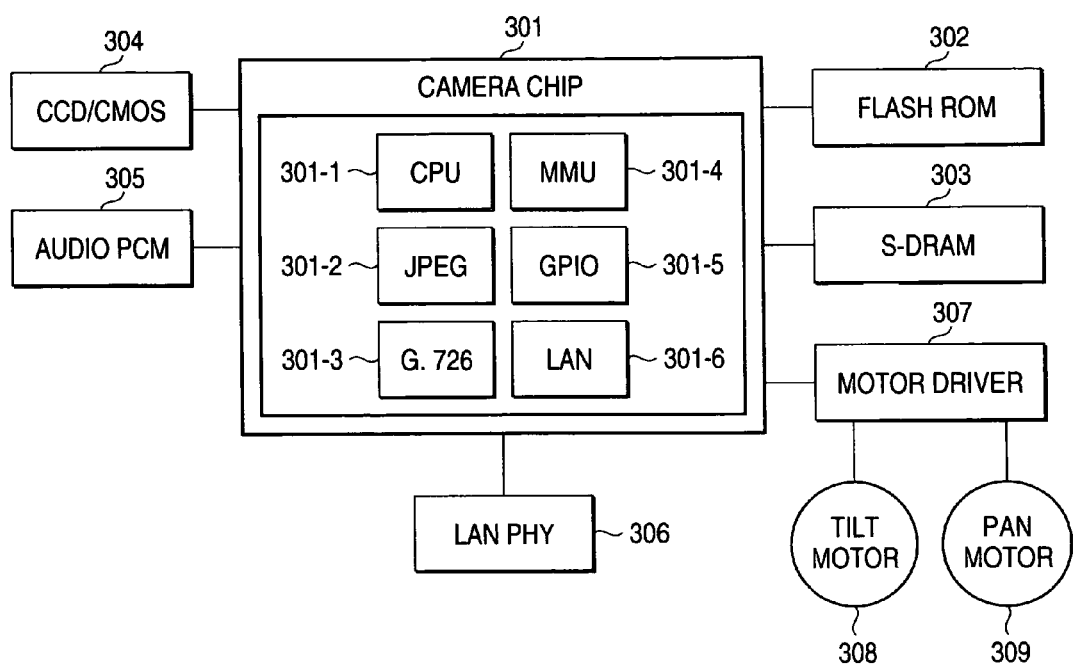
FIG. 9 shows a hardware configuration diagram of a camera of Embodiment 2 of the invention.

FIG. 9 shows a hardware configuration diagram of the camera of the invention.

Figure 10:
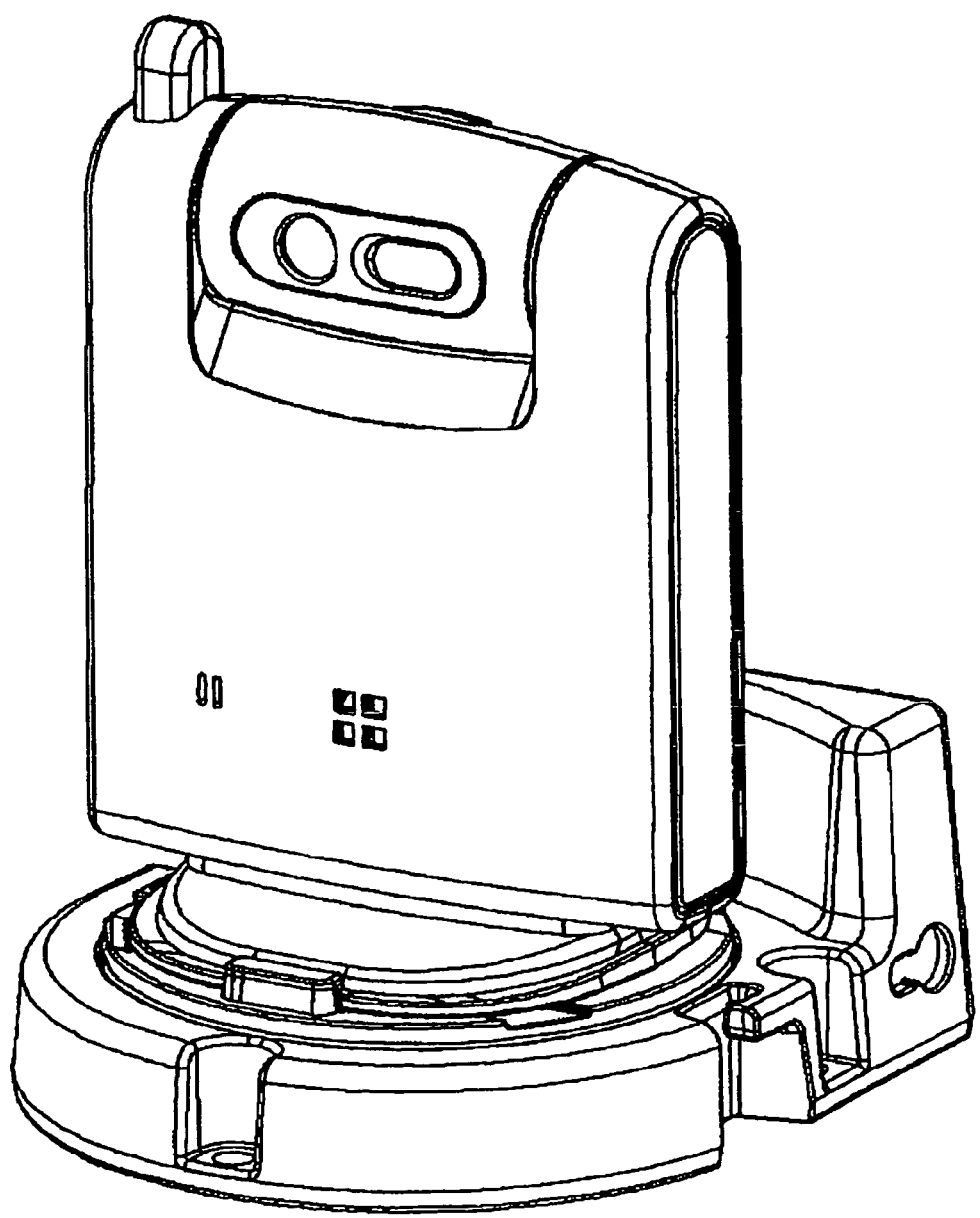
FIG. 10 shows an appearance of the camera of Embodiment 2 of the invention.

FIG. 10 shows an appearance of the camera of the invention.

Numeral 301 designates a camera chip containing the CPU and its peripheral circuits. Numeral 302 designates a flash ROM stored with the program and data for the actions of the camera chip 301. Numeral 303 designates a working S-DRAM for the cameral chip 301 to act. Numeral 304 designates a CCD and a CMOS chip for converting a taken image into electric signals. Numeral 305 designates an Audio PCM chip for inputting/outputting voice signals. Numeral 306 designates a LANPHY chip for an electric interface at the time of physical connections with a LAN interface. Numeral 307 designates a motor drive chip for moving the camera within a taking range, i.e., a Tilt motor 308 and a Pan motor 309. There are a microphone for voice inputting and a speaker for voice outputting, although not shown.

The camera chip 301 is configured to include: a CPU 301-1; a JPEG converter 301-2 for converting a taken image in electric signals, into an image of the JPEG format; a G.726 converter 301-3 for conversions into the voice data format for the network communication; an MMU (Memory Management Unit) 3014; a GPIO (General Purpose Input/Output); and a LAN (Local Area Network) 301-6.

This hardware configuration diagram of FIG. 9 and the camera configuration diagram of FIG. 1 are mapped, as follows. The camera 10 corresponds to the CCD 304; the voice input adjusting circuit 17a and the voice output adjusting circuit 18a to the Audio PCM 305; the portion of the communication control unit 13 to be connected with the LAN to the LANPHY 306; the portion for the communication control unit 13 for the control actions to the LAN unit 301-6; the pan motor 10b to the Pan Motor 309; the tilt motor 308 to the Tilt Motor 308; the image processor 12 to the JPEG converter 301-2; the voice reception processor 14 and the voice transmission processor 15 to the G.726 converter 301-3; the camera control unit 10a and the control unit 19 for their controls to the CPU 301-1; and the storage unit 20 to the S-DRAM 303.

Moreover, it is possible to realize: the flash ROM 302 with MX29LV320; the S-DRAM 303 with MT48CM16; the Audio PCM chip 305 with AK2308; the LANPHY chip 306 with ICS1893; the CCD chip 304 with the combination of ICX098, MN5400 and HV7131; and the motor drive chip 307 with LB1937.

With these configurations, there can be realized the network camera, which is enabled to make the display of voice transmittable not in the communication with other clients, in case the voice communication is permitted, to communicate, when the voice communication is intended, by pushing the display of voice transmittable to the display of voice receiving, and to restore the initial state automatically when a time elapses after the end of the communication, and which is made understandable in the icon display for the portal screen displaying information, easy in the controls and excellent in the controllability.

The invention can be applied to the network system for image transmissions and voice communications by using the voice mapping type network camera.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2004-191147 filed on Jun. 29, 2004, the contents of which are incorporated herein for reference.

What is claimed is:

1. A method of displaying information, comprising:
   transmitting a request of obtaining page information to a network capturing apparatus;
   displaying at least one of first display information, second display information and third display information in the page information;
   displaying the second display information indicating a voice output at a position of the first display information in the page information, when the first display information indicating a voice output possibility is selected by a user input device,
   displaying the first display information at a position of the second display information in the page information, when the second display information is selected by a user input device;
   transmitting a request for notifying the network capturing apparatus state to the network capturing apparatus, when the third display information indicating a temporary voice output inhibit is selected by a user input device;
   displaying the first display information at a position of the third display information when receiving a notification that another terminal has terminated a voice communication:
   counting a time in a case that the second display information is displayed after a termination of the voice communication; and
   displaying the first display information at a position of the second display information in the page information, when a predetermined time is elapsed from the start in the counting process.

2. A network capturing apparatus for connection to at least one terminal through a network, the network capturing apparatus comprising:
   a page information generating unit that generates first page information to be displayed on the terminals;
   a communication unit that communicates with the terminal through the network;
   a capturing unit that captures an image in a vicinity of the network capturing apparatus;
   a voice collecting unit that collects a sound in a vicinity of the network capturing apparatus;
   a voice outputting unit that outputs a sound based on sound data relating to a collected sound by the terminal via the network; and
   a control unit that controls voice communication with the sound data regarding the collected sound and the outputted sound in half duplex communication,
   wherein the page generating unit generates the first page information in response to a request of the first page information from the at least one of the terminals;
   wherein the first page information includes a caption image captured by the capturing unit and at least one of a first display information, a second display information and a third display information;
   wherein the first page information includes the first display information that indicates a voice outputting possibility in a case that the voice output is not inhibited at the terminal that transmits the request of the first page information and the another terminal does not output the sound data to the communication unit;
   wherein the first page information includes the second display information that indicates a voice outputting in a case that a voice output is performed at the terminal that transmits the request of the first page information;
   wherein the first page information includes the third display information that indicates a temporary voice output inhibit in a case that the another terminal is in the voice data transmission; and
   wherein the page information generating unit generates a second page information so as to change one display information to another display information in accordance with the change in a communication state of the network and a selection regarding at least one of the first to third display information and the communication unit transfers the second generated page information to the terminal,
   the network capturing apparatus further comprising:
   a timer unit that counts a time,
   wherein in a case that the second display information is displayed on the terminal after a termination of the voice communication, the page information generating unit generates the first page information instead of the second display information, when a predetermined time counted by timer unit elapses, and
   wherein a display portion is altered to other display portion so as to display the other display portion in accordance with the change in a communicating state of the voice communication, when the display portion in page information is selected by a graphical user interface of the terminal, the page information being transmitted from the network capturing apparatus.

3. A network capturing apparatus which is adapted to connect to a plurality of terminals through a network, the network capturing apparatus comprising:
   a capturing unit that captures an image around the network capturing apparatus;

a voice collecting unit that collects a sound in a vicinity of the network capturing apparatus;

a voice outputting unit that outputs a sound based on sound data transmitted from any one of the plurality of terminals;

a communication unit that performs communication with at least one of the plurality of terminals through the network, the communication including voice communication of half duplex communication with sound data based on the collected sound and the outputted sound;

a control unit that decides whether or not the voice communication is performed based on sound data transmitted from any one of the plurality of terminals; and a page information generating unit that generates, in response to a request for page information from the at least one of the plurality of terminals, page information to be displayed on the terminal which transmits the request, the page information including the image captured by the capturing unit, wherein if the control unit decides that the voice communication is not performed based on sound data transmitted from any one of the plurality of terminals, the page information generating unit generates the page information further including first display information, the first display information indicating that the voice communication performed based on sound data transmitted from any one of the plurality of terminals is available;

wherein if the control unit decides that the voice communication is performed based on the sound data transmitted from any one of the plurality of terminals, the page information generating unit generates the page information further including third display information, the third display information indicating that the voice communication performed based on sound data transmitted from any one of the plurality of terminals is temporally inhibited; and wherein the communication unit transfers, to the terminal which transmits the request, the page information including either the first display information or the third display information.

4. The network capturing apparatus as set forth in claim 3, wherein the page generating unit generates the page information having no display information in a case that the voice communication performed based on the sound data transmitted from any one of the plurality of terminals is inhibited, and wherein the control unit decides whether or not the voice communication is performed based on sound data transmitted from any one of the plurality of terminals in a case that the voice communication performed based on the sound data transmitted from any one of the plurality of terminals is available.

5. The network capturing apparatus as set forth in claim 3, wherein the page information further includes fourth display information, the fourth display information indicating that the voice communication performed based on sound data transmitted from the voice collecting unit is temporally inhibited, and wherein the page generating unit changes display information included in the page information from the fourth display information into fifth display information, if the communication unit receives, from the terminal which transmits the request, selection information indicating that the fourth display information is selected in the page information displayed on the terminal which transmits the request, the fifth display information indicating that the voice communication performed based on the sound data transmitted from the voice collecting unit is performed.

6. The network capturing apparatus as set forth in claim 3, wherein the page generating unit changes display information included in the page information from the third display information into the first display information if the communication unit receives, from the terminal which transmits the request, selection information indicating that the third display information is selected in the page information displayed on the terminal which transmits the request.

7. The network capturing apparatus as set forth in claim 3, wherein the control unit transmits the page information having the third display information to the terminal which transmits the request if the communication unit receives a request for a network capturing apparatus state notification periodically after a termination of the voice communication performed based on sound data transmitted from any one of the plurality of terminals.

8. The network capturing apparatus as set forth in claim 3, wherein if the communication unit performs the voice communication based on sound data transmitted from the terminal which transmits the request, the page information generating unit changes display information included in the page information from the first display information into second display information, the second display information indicating that the voice communication performed based on sound data transmitted from any one of the plurality of terminals is performed.

9. The network capturing apparatus as set forth in claim 8, wherein the communication unit performs the voice communication based on the sound data transmitted from the terminal which transmits the request if the communication unit receives, from the terminal which transmits the request, selection information indicating that the first display information is selected in the page information displayed on the terminal which transmits the request.

10. The network capturing apparatus as set forth in claim 8, wherein the page generating unit changes display information included in the page information from the second display information into the first display information if the communication unit receives, from the terminal which transmits the request, selection information indicating that the second display information is selected in the page information displayed on the terminal which transmits the request.

11. The network capturing apparatus as set forth in claim 8, further comprising a timer unit that counts a time, wherein in a case that the second display information is displayed on the terminal which transmits the request after a termination of the voice communication, the page generating unit changes display information included in the page information from the second display information into the first display information if a predetermined time counted by timer unit elapses.

12. A communication method for communication with a plurality of terminals through a network, the communication method comprising:

(a) capturing an image;

(b) collecting a sound;

(c) outputting a sound based on sound data transmitted from any one of the plurality of terminals;

(d) performing communication with at least one of the plurality of terminals through the network, the communication including voice communication of half duplex communication with sound data based on the collected sound and the outputted sound;

(e) deciding whether or not the voice communication is performed based on sound data transmitted from any one of the plurality of terminals; and (f) generating, in response to a request for page information from the at least one of the plurality of terminals, page information to be displayed on the terminal which transmits the request, the page information including the captured image, wherein if it is decided that the voice communication is not performed based on sound data transmitted from any one of the plurality of terminals in step (e), the page information further including first display information is generated in step (f), the first display information indicating that the voice communication performed based on sound data transmitted from any one of the plurality of terminals is available;

wherein if it is decides that the voice communication is performed based on the sound data transmitted from any one of the plurality of terminals in step (e), the page information further including third display information is generated in step (f), the third display information indicating that the voice communication performed based on sound data transmitted from any one of the plurality of terminals is temporally inhibited; and wherein the page information including either the first display information or the third display information is transferred to the terminal which transmits the request in step (d).

13. The communication method as set forth in claim 12, wherein if the voice communication performed based on sound data transmitted from the terminal which transmits the request in step (d), display information included in the page information is changed from the first display information into second display information in step (f), the second display information indicating that the voice communication performed based on sound data transmitted from any one of the plurality of terminals is performed.

14. The communication method as set forth in claim 13, wherein the voice communication is performed based on the sound data transmitted from the terminal which transmits the request in step (d) if selection information is received from the terminal which transmits the request, the selection information indicating that the first display information is selected in the page information displayed on the terminal which transmits the request.

15. The communication method as set forth in claim 13, wherein display information included in the page information is changed from the second display information into the first display information in step (f) if selection information is received from the terminal which transmits the request, the selection information indicating that the second display information is selected in the page information displayed on the terminal which transmits the request.

16. The communication method as set forth in claim 13, further comprising (g) counting a time, wherein in a case that the second display information is displayed on the terminal which transmits the request after a termination of the voice communication, display information included in the page information is changed from the second display information into the first display information in step (f) if a predetermined time counted in step (g) elapses.

17. The communication method as set forth in claim 12, wherein the page information having no display information is generated in step (f) in a case that the voice communication performed based on the sound data transmitted from any one of the plurality of terminals is inhibited, and wherein the it is decided whether or not the voice communication is performed based on sound data transmitted from any one of the plurality of terminals in step (e) in a case that the voice communication performed based on the sound data transmitted from any one of the plurality of terminals is available.

18. The communication method as set forth in claim 12, wherein the page information further includes fourth display information, the fourth display information indicating that the voice communication performed based on collected sound is temporally inhibited, and wherein display information included in the page information is changed from the fourth display information into fifth display information in step (f) if selection information is received from the terminal which transmits the request, the selection information indicating that the fourth display information is selected in the page information displayed on the terminal which transmits the request, the fifth display information indicating that the voice communication performed based on the collected sound is performed.

19. The communication method as set forth in claim 12, wherein display information included in the page information is changed from the third display information into the first display information in step (f) if selection information is received from the terminal which transmits the request, the selection information indicating that the third display information is selected in the page information displayed on the terminal which transmits the request.

20. The communication method as set forth in claim 12, wherein the page information having the third display information is transmitted to the terminal which transmits the request in step (d) if a request for a network capturing apparatus state notification periodically is received in step (d) after a termination of the voice communication performed based on sound data transmitted from any one of the plurality of terminals.

21. A computer-readable recording medium comprising computer-executable instructions for causing a computer to execute communication operations between a network capturing apparatus and a terminal through a network, the communication operations comprising:

a voice collecting operation comprising collecting a sound in a vicinity of the terminal;

a voice outputting operation comprising outputting a sound at the terminal based on sound data transmitted from the network capturing apparatus;

a voice communication operation comprising performing, with the network capturing apparatus through the network, half duplex voice communication with sound data based on the collected sound and the outputted sound; and a control operation comprising deciding whether or not the voice communication operation is performed based on sound data transmitted from the network capturing apparatus, wherein the control operation, responsive to page information including first display information, controls display of the first display information on the terminal, the first display information indicating that the voice communication operation performed based on sound data transmitted from the terminal is available; and wherein the control operation, responsive to page information further including third display information, controls display of the third display information on the terminal, the third display information indicating that the voice communication operation performed based on sound data transmitted from.

22. A network system, comprising:
a network capturing apparatus; and
a plurality of terminals adapted to voice communicate with the network capturing apparatus in half duplex communication,
the network capturing apparatus including:
a capturing unit that captures an image in a vicinity of the network capturing apparatus,
a voice collecting unit that collects a sound in a vicinity of the network capturing apparatus,
a voice outputting unit that outputs a sound based on sound data transmitted from any one of the plurality of terminals,
a communication unit that performs communication with at least one of the plurality of terminals through the network, the communication unit including the voice communication of the half duplex communication with sound data based on the collected sound and the outputted sound,
a control unit that decides whether or not the voice communication is performed based on sound data transmitted from any one of the plurality of terminals, and
a page information generating unit that generates, in response to a request for page information from the at least one of the plurality of terminals, page information to be displayed on the terminal which transmits the request, the page information including the image captured by the capturing unit,
wherein if the control unit decides that the voice communication is not performed based on sound data transmitted from any one of the plurality of terminals, the page information generating unit generates the page information further including first display information, the first display information indicating that the voice communication performed based on sound data transmitted from any one of the plurality of terminals is available,
wherein if the control unit decides that the voice communication is performed based on the sound data transmitted from any one of the plurality of terminals, the page information generating unit generates the page information further including second display information, the second display information indicating that the voice communication performed based on sound data transmitted from any one of the plurality of terminals is temporally inhibited, and
wherein the communication unit transfers, to the terminal which transmits the request, the page information including either the first display information or the second display information.

23. A communication apparatus for connection to a first terminal which transmits first sound data to the communication apparatus and to a second terminal which transmits second sound data to the communication apparatus, the communication apparatus comprising:
a voice outputting unit that outputs the first sound data or the second sound data;
a communication unit that performs communication with the first terminal and the second terminal; and
a control unit that controls the voice outputting unit to output either the first sound data or the second sound data,
wherein the control unit transmits a data, indicating the second sound data is inhibited, to the second terminal through the communication unit when the voice outputting unit is outputting the first sound data and the control unit receives a request for transmitting the second sound data from the second terminal.

24. The communication apparatus according to 23, wherein the data which the control unit transmits to the second terminal includes information for display by the second terminal to indicate that the second sound data is inhibited.

25. The communication apparatus according to 23, wherein the data which the control unit transmits to the second terminal includes page information, which the control unit creates, indicating the second sound data is inhibited.

26. The communication apparatus according to 25, further comprising a capturing unit that captures an image around the communication apparatus, wherein the page information includes the image captured by the capturing unit.

27. The communication apparatus according to 23, wherein the control unit, in response to (i) receipt of said request for transmitting the second sound data from the second terminal while the second sound data is inhibited and (ii) termination of outputting of the first sound data, controls the voice outputting unit to output the second sound data and transmits data for display by the second terminal indicating that the second sound data is available.

28. A communication control method for controlling communication between a communication apparatus for connection to a first terminal which transmits first sound data to the communication apparatus and to a second terminal which transmits second sound data to the communication apparatus, the communication control method comprising the following operations:
(a) controlling a communication unit of the communication apparatus to perform communications with the first terminal and the second terminal; and
(h) controlling a voice outputting unit of the communication apparatus to output either the first sound data or the second sound data,
wherein operation (a) comprises transmitting a data, indicating the second sound data is inhibited, to the second terminal through the communication unit when the voice outputting unit is outputting the first sound data and the communication apparatus receives a request for transmitting the second sound data from the second terminal.

29. The communication control method according to 28, wherein said data includes information for display by the second terminal to indicate that the second sound data is inhibited.

30. The communication control method according to 28, further includes creating page information indicating the second sound data is inhibited and said data includes said page information.

31. The communication control method according to 30, further comprising capturing an image around the communication apparatus, wherein the page information includes said image.

32. The communication control method according to 28, wherein operation (a) comprises, in response to (i) receipt of said request for transmitting the second sound data from the second terminal while the second sound data is inhibited and (ii) termination of outputting of the first sound data, controlling the voice outputting unit to output the second sound data and transmitting data for display by the second terminal indicating that the second sound data is available.

* * * * *